US008812984B2

(12) United States Patent
Nakanishi

(10) Patent No.: US 8,812,984 B2
(45) Date of Patent: Aug. 19, 2014

(54) CHARACTER INPUT DEVICE, IMAGE FORMING APPARATUS AND CHARACTER KEY DISPLAY METHOD

(75) Inventor: Shinichi Nakanishi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 355 days.

(21) Appl. No.: 13/167,804

(22) Filed: Jun. 24, 2011

(65) Prior Publication Data

US 2011/0317194 A1 Dec. 29, 2011

(30) Foreign Application Priority Data

Jun. 25, 2010 (JP) .................................. 2010-144699

(51) Int. Cl.
*G06F 3/048* (2013.01)

(52) U.S. Cl.
USPC ............................. 715/828; 715/773; 715/780

(58) Field of Classification Search
None
See application file for complete search history.

(56) References Cited

U.S. PATENT DOCUMENTS

| | | | | |
|---|---|---|---|---|
| 5,128,672 A * | 7/1992 | Kaehler | ........................... | 341/23 |
| 6,573,844 B1 * | 6/2003 | Venolia et al. | ................... | 341/22 |
| 6,621,424 B1 * | 9/2003 | Brand | ............................. | 341/22 |
| 6,646,572 B1 * | 11/2003 | Brand | ............................. | 341/22 |
| 7,443,316 B2 * | 10/2008 | Lim | .................................. | 341/22 |
| 8,232,973 B2 * | 7/2012 | Kocienda et al. | ............. | 345/173 |
| 8,516,367 B2 * | 8/2013 | Archer | .......................... | 715/257 |
| 2007/0046641 A1 * | 3/2007 | Lim | ................................ | 345/173 |
| 2007/0168873 A1 * | 7/2007 | Lentz | ............................ | 715/763 |
| 2007/0245259 A1 * | 10/2007 | Carlson | ........................ | 715/773 |
| 2010/0194690 A1 * | 8/2010 | Wilairat | ....................... | 345/168 |

FOREIGN PATENT DOCUMENTS

| | | |
|---|---|---|
| JP | 05-088804 | 4/1993 |
| JP | 2004-199356 | 7/2004 |
| JP | 2005-092521 | 4/2005 |

* cited by examiner

*Primary Examiner* — Ryan Pitaro
*Assistant Examiner* — Mahelet Shiberou
(74) *Attorney, Agent, or Firm* — Knobbe Martens Olson & Bear LLP

(57) ABSTRACT

An input device comprises: an operation unit having a display part that can display a plurality of character keys and a touch screen; a subsequent input candidate search unit that, upon detection of contact to an area corresponding to a specific character key in the touch screen, searches among the input candidate string for an input candidate string with a first character being a specific character corresponding to the area thus detected, as a subsequent input candidate string; a subsequent input candidate determination unit that, with regard to the subsequent input candidate thus found, determines a subsequent character following the first character as a subsequent input candidate character; and a display exchange unit that displays a character key of the subsequent input candidate character thus determined, by exchanging with a character key arranged in the vicinity of a character key for the specific character as the first character.

17 Claims, 11 Drawing Sheets

| ARRANGEMENT INFORMATION | CHARACTER | ARRANGEMENT INFORMATION | CHARACTER | ARRANGEMENT INFORMATION | CHARACTER |
|---|---|---|---|---|---|
| 1 | q | 11 | a | 21 | @ |
| 2 | w | 12 | s | 22 | z |
| 3 | e | 13 | d | 23 | x |
| 4 | r | 14 | f | 24 | c |
| 5 | t | 15 | g | 25 | v |
| 6 | y | 16 | h | 26 | b |
| 7 | u | 17 | j | 27 | n |
| 8 | i | 18 | k | 28 | m |
| 9 | o | 19 | l | 29 | . |
| 10 | p | 20 | Space | 30 | Enter |

CHARACTER INPUT DEVICE, IMAGE FORMING APPARATUS AND CHARACTER KEY DISPLAY METHOD

This application is based on and claims the benefit of priority from Japanese Patent Application No. 2010-144699, filed on 25 Jun. 2010, the content of which is incorporated herein by reference.

BACKGROUND OF THE INVENTION

1. Field of the Invention

The present invention relates to a character input device, an image forming apparatus provided with the character input device and a character key display method.

2. Related Art

In recent years, an image forming apparatus such as a copy machine, a facsimile machine, a multifunction peripheral and the like includes a character input device that displays a software keyboard, in which a plurality of character keys is arranged in a predetermined arrangement, on the touch screen (touch screen).

A user can input, for example, the user's name, a user ID, a password, an e-mail address, a name for an image to be saved, a file name, a title, and the like using the character input device.

However, due to a limited display area on the touch screen, the software keyboard displayed on the touch screen tends to have character keys (buttons) smaller in size than character keys of a conventional hardware keyboard, and to have a character key arrangement largely different from that of a hardware keyboard. This causes a problem of difficulty in character input, and even a user accustomed to a hardware keyboard cannot smoothly input characters.

In order to solve such a problem, as Prior Art 1, a Latin alphabet character (romaji) input device is disclosed in which, during Latin alphabet character input with a touch screen, after input of a consonant key, only vowel keys and double consonant keys that may follow the consonant are highlighted. Such a configuration is expected to prevent input of an invalid character sequence in Latin alphabet characters.

As Prior Art 2, an alphabet input system with character prediction using a keyboard is disclosed for an electronic apparatus provided with a keyboard and a display screen. In this system, a plurality of selection control keys is separately provided in the keyboard, and a plurality of subsequent input candidates with reference numbers is displayed in a subsequent area of the display screen, in response to previous alphabet input. In addition, this system is configured such that a desired candidate can be selected and input from the subsequent input candidates. Such a configuration is expected to reduce an average number of keystrokes by using the alphabet input system with character prediction along with a conventional alphabet input.

In addition, as Prior Art 3, a character input device is disclosed in which a plurality of characters is assigned to virtual keys displayed on a display unit, and when a user operates an operating unit to select a virtual key and a character assigned thereto, a plurality of candidate words related to the selected character is displayed. Such a configuration is expected to allow a user to input characters rapidly without stress, and allow an efficient use of a display region on a display screen.

However, the character input device of Prior Art 1 is targeted at Latin alphabet character input and cannot be applied to all languages that are generally input, for example English words and Japanese words in hiragana and katakana.

In addition, technologies disclosed in Prior Arts 2 and 3 require a subsequent display region that displays a plurality of subsequent input candidates or virtual keys corresponding to an input operation by a user, in addition to a display region that displays a normal software keyboard, leading to a problem of a need of extended display area of a touch screen.

SUMMARY OF THE INVENTION

Given this, the present invention is aimed at providing a character input device that can allow a user of a software keyboard to smoothly and appropriately input characters.

The present invention aims at providing also an image forming apparatus provided with the character input device.

In addition, the present invention aims at providing a display method of character keys that can allow a user of a software keyboard to smoothly and appropriately input characters.

The present invention relates to a character input device including: an operation unit having a display part that can display a plurality of character keys and an input confirmation key in a predetermined arrangement and a touch screen that is disposed on a front face of the display part; an input candidate storage unit that stores at least one string as an input candidate string; a subsequent input candidate search unit that, upon detection of contact to an area corresponding to a specific character key in the touch screen, searches among the input candidate string for an input candidate string with a first character being a specific character corresponding to the area thus detected, as a subsequent input candidate string; a subsequent input candidate determination unit that, with regard to the subsequent input candidate thus found, determines a subsequent character following the first character as a subsequent input candidate character; and a display exchange unit that displays a character key of the subsequent input candidate character thus determined, by exchanging with a character key arranged in the vicinity of a character key for the specific character as the first character.

In addition, the present invention relates to an image forming apparatus including a character input device, the character input device including: an operation unit having a display part that can display a plurality of character keys and an input confirmation key in a predetermined arrangement and a touch screen that is disposed on a front face of the display part; an input candidate storage unit that stores at least one string as an input candidate string; a subsequent input candidate search unit that, upon detection of contact to an area corresponding to a specific character key in the touch screen, searches among the input candidate string for an input candidate string with a first character being a specific character corresponding to the area thus detected, as a subsequent input candidate string; a subsequent input candidate determination unit that, with regard to the subsequent input candidate thus found, determines a subsequent character following the first character as a subsequent input candidate character; and a display exchange unit that displays a character key of the subsequent input candidate character thus determined, by exchanging with a character key arranged in the vicinity of a character key for the specific character as the first character.

Furthermore, the present invention relates to a character key display method for a character input device, the character input device including: an operation unit having a display part that can display a plurality of character keys and an input confirmation key in a predetermined arrangement and a touch screen that is disposed on a front face of the display part; and an input candidate storage unit that stores at least one specific string as an input candidate string, including: a subsequent input candidate search step of, upon detection of contact to an area corresponding to a specific character key in the touch screen, searching among the input candidate string for an input candidate string starting with a specific character corresponding to the area thus detected as a first character, as a subsequent input candidate string; a subsequent input candidate determination step of, with regard to the subsequent input candidate thus found, determining a subsequent character following the first character as a subsequent input candidate character; and a display exchange step of displaying a character key of the subsequent input candidate character thus determined, by exchanging with a character key arranged in the vicinity of a character key for the specific character as the first character.

DETAILED DESCRIPTION OF THE INVENTION

An embodiment of an image forming apparatus provided with the character input device of the present invention is described hereinafter with reference to the accompanying drawings for better understanding of the present invention. It should be noted that the following embodiments are mere examples of implementation of the present invention, and in no way restrict the technical scope of the present invention. As used herein, an alphabetical letter "S" prefixed to a number in the flowcharts represents a step.

An image forming apparatus (for example, a multifunction peripheral) provided with the character input device according to the present invention (for example an operation unit) is described hereinafter.

Figure 1:
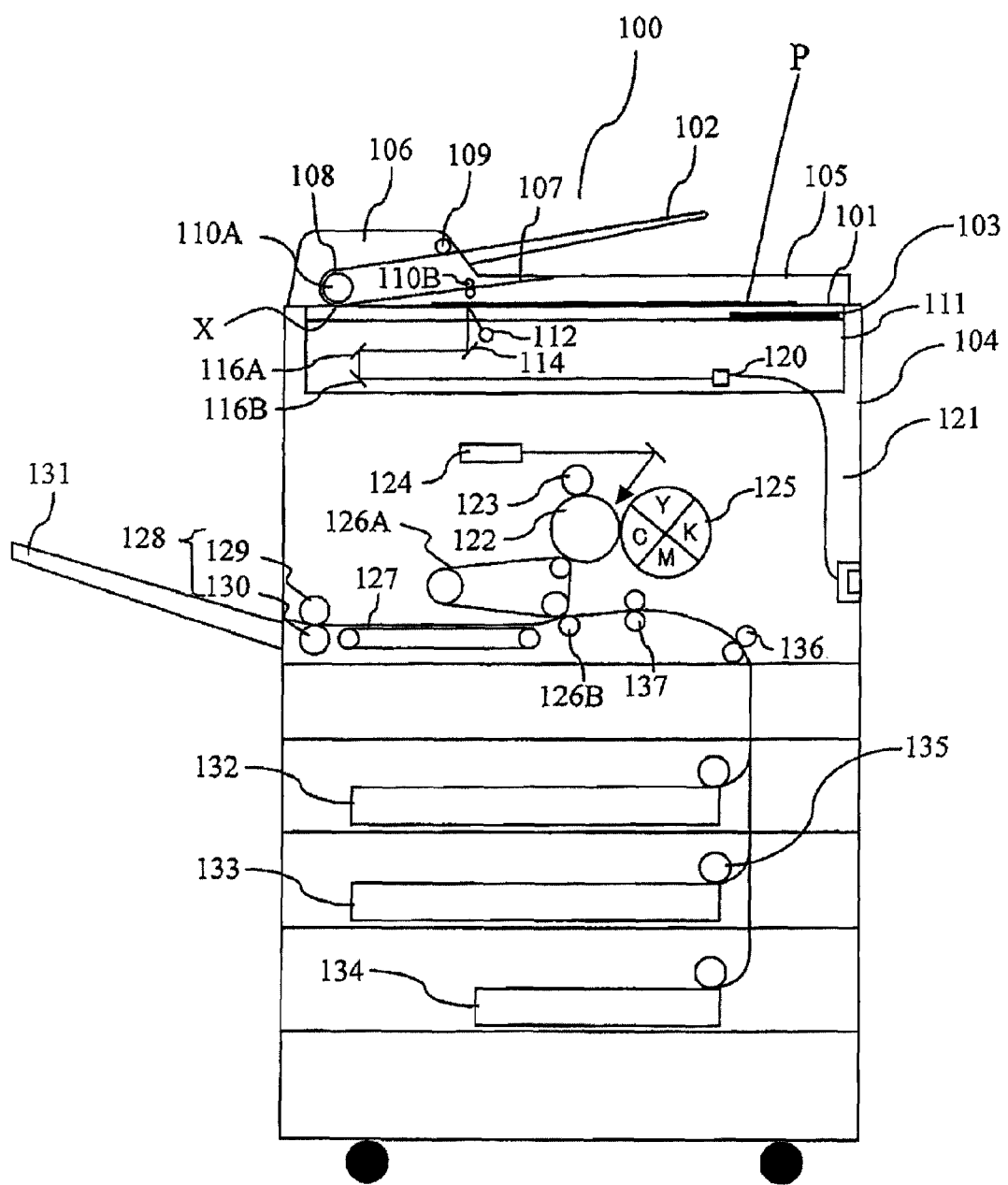
FIG. 1 is a schematic view illustrating an entire configuration within a multifunction peripheral according to the present invention.

FIG. 1 is a schematic view illustrating an entire configuration within a multifunction peripheral according to the present invention. However, the details of each component not directly related to the present invention are omitted.

The multifunction peripheral 100 according to the present invention includes, for example, a printer or a scanner alone, or to a multifunction peripheral provided with a printer, a copying machine, a scanner, a facsimile, and the like. Here, operation of the multifunction peripheral 100 is briefly described taking an example in which a function of copying a document utilizing the multifunction peripheral 100 is provided.

When printing a document P using the multifunction peripheral 100, for example, a user places the document P on a platen 101 or a document tray 102 shown in FIG. 1, and inputs conditions for copying and makes an instruction for printing on an operation unit 103 disposed near the platen 101.

A configuration of the operation unit 103 is described later in detail.

In response to the instruction for printing, units described below (driving units) operate to print.

By inputting the copy setting conditions and the instruction for copying through the operation unit 103, components (driving units) described below operate, and printing (image formation to a sheet) is performed.

Specifically, as shown in FIG. 1, the multifunction peripheral 100 according to the present embodiment is provided with a main body 104 and a platen cover 105 disposed above the main body 104.

The platen 101 is disposed on an upper surface of the main body 104.

The platen 101 is configured to be opened and closed with the platen cover 105.

The platen cover 105 is provided with an automatic document feeder 106, the document tray 102, and a discharging tray 107.

The automatic document feeder 106 is configured by a document carrier path 108, a pickup roller 109, carrying rollers 110A and 110B, and the like, all of which are provided within the platen cover 105.

The document carrier path 108 is a carrier path for a document communicating from the document tray 102 to the discharging tray 107 via a read position X at which reading is carried out by an image reading unit 111 provided to the main body 104.

The automatic document feeder 106 picks up a plurality of document sheets placed on the document tray 102 into the document carrier path 108 one by one using the pickup roller 109, causes the picked up document sheets to pass through the read position X using the carrying roller and the like, and discharges the document sheets to the discharging tray 107 using the carrying roller 110B.

While passing through the read position X, the document is read by the image reading unit 111.

The image reading unit 111 is disposed under the platen 101.

Figure 2:
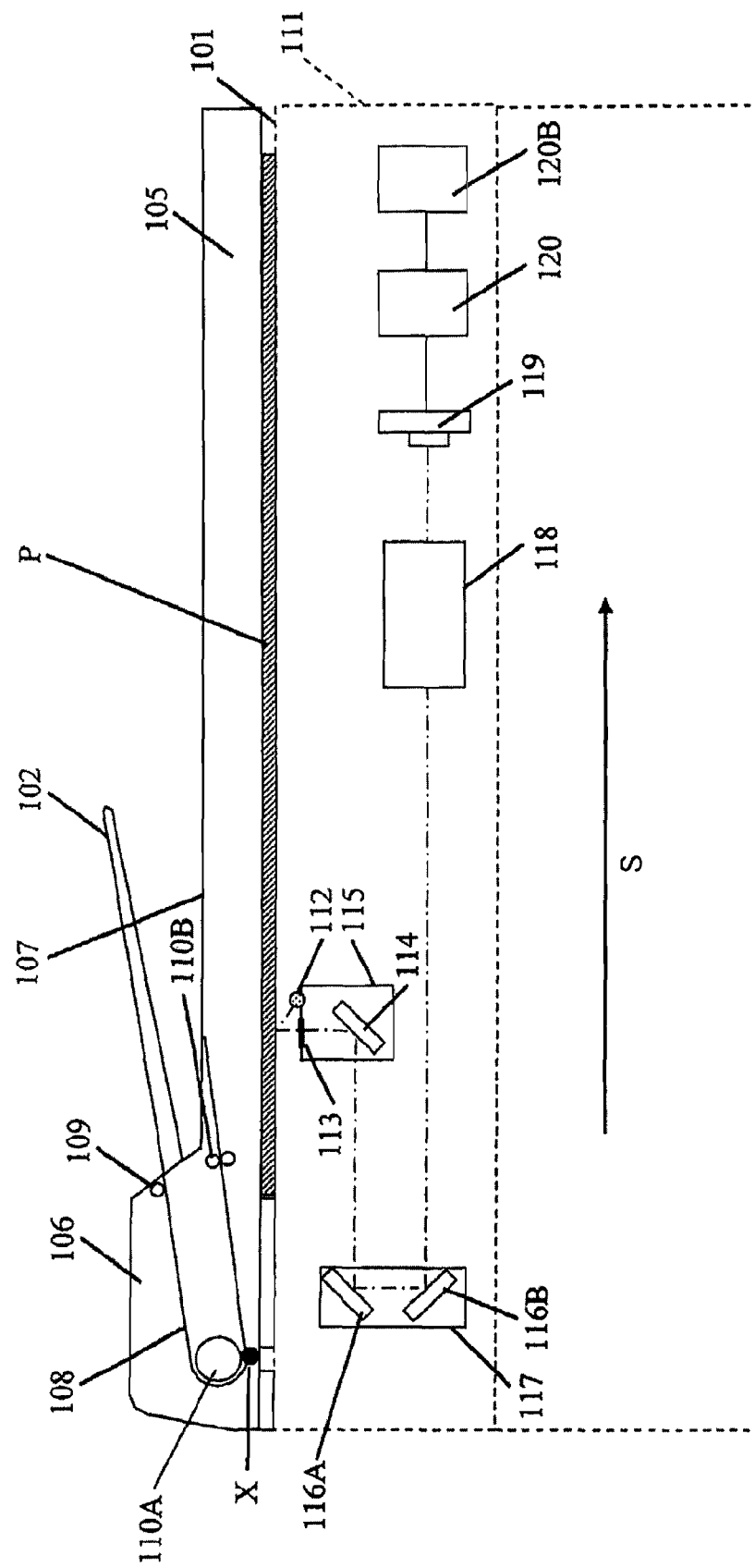
FIG. 2 is an enlarged view illustrating an image reading unit according to the present invention.

The details of the image reading unit 111 are illustrated in FIG. 2. The image reading unit 111 is provided with a first movable carriage 115 including a light source 112 elongated in a scan direction and configured to irradiate the platen 101, a slit 113 configured to selectively transmit light from the platen 101, and a mirror 114 configured to guide the light from the platen 101, a subsequent movable carriage 117 including mirrors 116A and 116B configured to re-reflect reflected light from the first movable carriage 115, a lens group 118 configured to optically correct the light guided by the mirror, an image pickup device 119 configured to receive the light corrected by the lens group 118, and an image data generating unit 120 configured to convert the light received by the image pickup device 119 into electrical signals and perform correction processing, image quality processing, compression processing, or the like as needed.

When reading the document on the automatic document feeder 106, the light source 112 moves to a position at which the read position X can be irradiated and emits light.

The light from the light source 112 is transmitted through the platen 101 and reflected on the document that passes through the read position X, and is guided toward the image pickup device 119 by means of the slit 113, the mirrors 114, 116A, and 116B, and the lens group 118.

The image pickup device 119 converts the received light into electrical signals, and transmits the electrical signals to the image data generating unit 120.

The light received by the image pickup device 119 is inputted to the image data generating unit 120 as analog electrical signals of R (red), G (green), and B (blue).

The image data generating unit 120 performs analog-digital conversion, i.e. digitalizes, the analog electrical signals.

Furthermore, the image data generating unit 120 takes the sequentially converted digitalized signal as a piece of unit data (concentration value), and performs correction processing, image quality processing, compression processing, or the like on the piece of unit data, thereby generating image data configured by a plurality of pieces of unit data.

Moreover, the image reading unit 111 is able to read a document sheet placed on the platen 101, in addition to the document carried by the automatic document feeder 106.

When reading the document sheet placed on the platen 101, the first movable carriage 115 moves in a sub scan direction (SC) while causing the light source 112 to emit light, and the subsequent movable carriage 117 moves in a direction toward the image pickup device 119 at half the speed of the first movable carriage 115 so as to make a length of a light path from the light source 112 to the image pickup device 119 constant.

Similarly to the case of the document carried by the automatic document feeder 106, the image pickup device 119 converts light from the document placed on the platen 101 into electrical signals based on light guided by the mirrors 114, 116A, and 116B, and the image data generating unit 120 generates image data (document data) based on the converted signals and records the image data in a recording unit 120B.

The image forming unit 121 is disposed under the image reading unit 111 of the main body 104, and prints (outputs) the image data recorded in the recording unit 120B.

Examples of image data that the image forming unit 121 is able to print include image data generated by the image data generating unit 120 as described above, and image data received from a terminal such as a personal computer, connected to the multifunction peripheral 100 in a network such as LAN via a network interface.

The printing method employed by the image forming unit 121 is the xerographic method.

The xerographic method is a method of forming a latent image on the photoconductor drum 122 by charging the photoconductor drum 122 evenly using a charger 123, and then irradiating the photoconductor drum 122 by a laser 124, and forming a visible image by attaching toner by a developer 125, and transferring the visible image to a transfer medium using a transfer roller.

In a case of a multifunctional peripheral that supports a full color image, the developer (rotary developer) 125 rotates in a circumferential direction about a rotational axis that is perpendicular to the paper surface in FIG. 1, and a developing unit containing toner of a corresponding color is provided at a position opposing the photoconductor drum 122. In this state, the latent image on the photoconductor drum 122 is developed by the toner contained in the developer 125, and is transferred to an intermediate transfer belt 126A. It should be noted that the developer 125 includes four developing units 125(Y), 125(C), 125(M), and 125(K) respectively containing toner of yellow (Y), cyan (C), magenta (M), and black (K). By performing the transfer to the intermediate transfer belt 126A for each color, a full color image is formed on the intermediate transfer belt 126A.

The transfer medium on which the visible image is printed, i.e. printing sheet, is one of those placed in paper feed trays such as paper cassettes 132, 133, and 134.

When performing the printing, the image forming unit 121 picks up a single transfer medium from one of the paper feed trays using a pickup roller 135, and feeds the picked up transfer medium between the intermediate transfer belt 126A and a transfer roller 126B using a carrying roller 136 and a resist roller 137.

The image forming unit 121 transfers the visible image on the intermediate transfer belt 126A to the transfer medium that has been fed between the intermediate transfer belt 126A and the transfer roller 126B, and carries the transfer medium to a fusing unit 128 (fuser) using a carrying belt 127 in order to fuse the visible image. The fusing unit 128 is provided with a heating roller 129 having a built-in heater, and a pressure roller 130 that is pressed against the heating roller 129 at a predetermined pressure. When the transfer medium passes between the heating roller 129 and the pressure roller 130, the visible image is fused to the transfer medium by heat and a pressing force applied on the transfer medium. The transfer medium on which the fusing has been performed is discharged to a discharge tray 131.

By the above described steps, the multifunction peripheral 100 provides a function of copying to a user.

Figure 3:
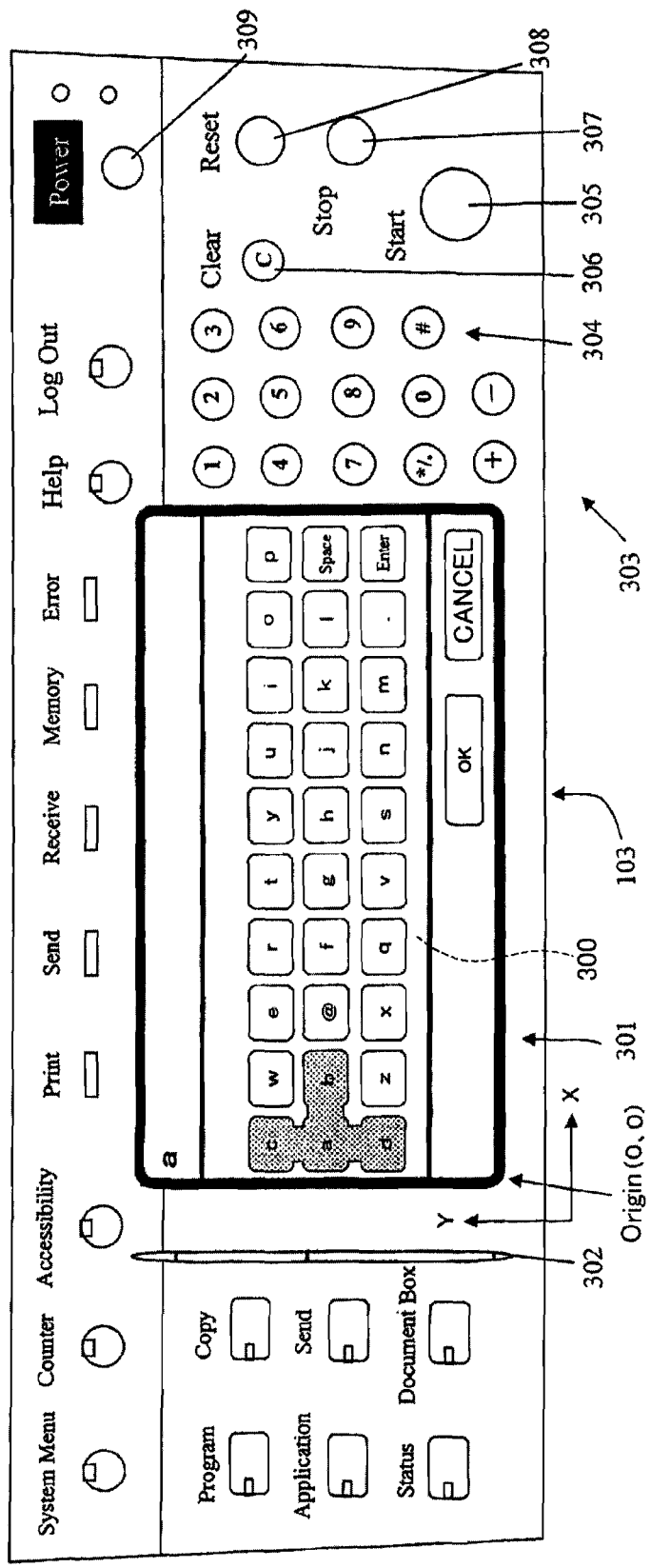
FIG. 3 is a schematic view illustrating an entire configuration of an operation unit according to the present invention.

FIG. 3 is a schematic view illustrating an entire configuration of an operation unit according to the present invention.

The user operates the operation unit 103 to input copy setting conditions relating to the copying function described above, for example, such as the number of sheets to be printed and the size of printing sheet, to activate a private print function that will be later described, to input a specific user ID, and to confirm the copy setting condition, the user ID that have been inputted, and the like.

An operation unit 103 has a display part 300 that can display a plurality of character keys and an input confirmation key in a predetermined arrangement and a touch screen 301 that is disposed on a front face of the display part 300.

When inputting the setting conditions, characters, and the like, a touch screen 301 (operation panel), a stylus pen 302, or an operation key 303 provided in the operation unit 103 is used.

An analog resistance film-type touch screen is employed as the touch screen 301 in the present embodiment. The touch screen 301 is configured by a translucent upper film and a lower glass base plate being layered via a spacer. On facing surfaces of the upper film and the lower glass base plate, a transparent electrode layer composed of ITO (Indium Tin Oxide) and the like is provided.

The touch screen 301 is composed such that, upon pushing of (contact to) the upper film by a user, the transparent electrode layer on the upper film side and the transparent electrode layer on the lower glass base plate side contact each other at a position corresponding to a pushed position (contacted position, contacted area).

The touch screen 301 applies voltage to the upper film or the lower glass base plate and obtains a voltage value corresponding to the pushed position from the upper film or the lower glass base plate, thereby detecting a coordinate value (pushed position) corresponding to the voltage value.

Upon detection of contact to an area corresponding to a certain character key by the touch screen 301, the operation unit 103 inputs a character corresponding to the certain character key.

If the pushed position (contacted position, contacted area) detected by the touch screen 301 is included in (overlaps) a display area of a character key or the like in a keyboard window displayed to be visible from the outside through the touch screen, the operation unit 103 inputs the character.

In addition to the case of character keys, the abovementioned operation of the operation unit 103 applies also to the cases of a keyboard display key, setting condition keys and the like.

Below the lower glass base plate of the touch screen 301, the display unit 300 such as LCD (Liquid Crystal Display) is disposed.

For example, when a keyboard window (the character keys, the input confirmation key and the like), an initial window, or the like is displayed on the display unit 300, the window is displayed to be visible from the outside through the touch screen 301. The window is displayed as if being displayed on the touch screen 301.

Furthermore, a stylus pen 302 is provided near the touch screen 301. When the user touches the touch screen 301 with the tip end of the stylus pen 302, the touch screen 301 detects a coordinate value corresponding to the contacted position (pushed position). If a character key or the like corresponds to (overlaps) the coordinate value thus detected, the character key or the like is selected. The user can select a character key and the like displayed using the stylus pen 302.

Furthermore, a predetermined number of the operation keys 303 are provided near the touch screen 301. The operation keys 303 include, for example, number keys 304, a start key 305, a clear key 306, a stop key 307, a reset key 308, and a power key 309. The number keys 304 are used for inputting specific numerical values for setting the number of copies and magnification.

Figure 4:
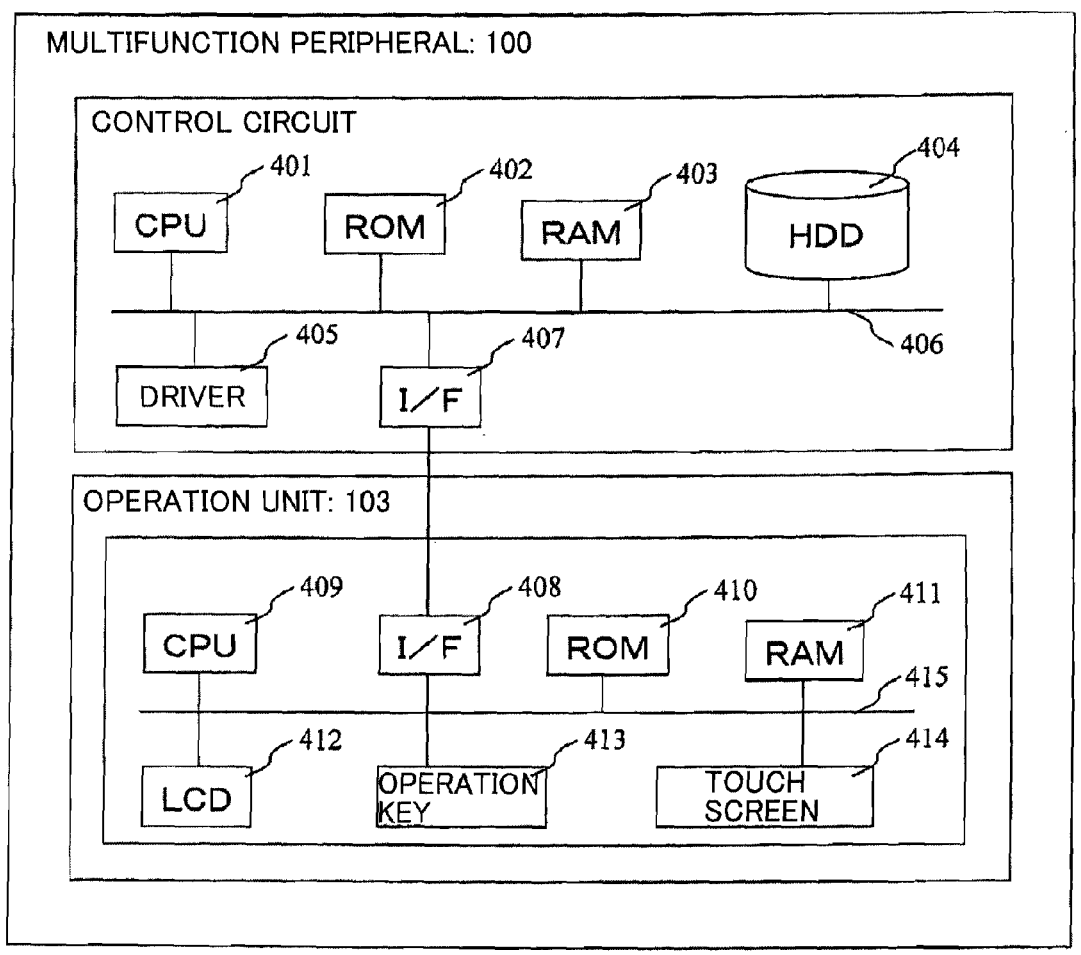
FIG. 4 is a diagram illustrating a hardware configuration of a control system of the multifunction peripheral and the operation unit according to the present invention.

Next, a hardware configuration of a control system of the multifunction peripheral 100 and the operation unit 103 is described with reference to FIG. 4. FIG. 4 is a diagram illustrating a hardware configuration of a control system of the multifunction peripheral 100 and the operation unit 103 according to the present embodiment. However, the details of each component not directly related to the present embodiment are omitted.

A control circuit of the multifunction peripheral 100 is configured such that a CPU (Central Processing Unit) 401, ROM (Read Only Memory) 402, RAM (Random Access Memory) 403, a HDD (Hard Disk Drive) 404, and drivers 405 respectively corresponding to the driving units are connected via an internal bus 406.

The CPU 401 uses the RAM 403 as a working area, for example, to execute programs recorded in the ROM 402 and the HDD 404, receives data and instructions from the drivers 405 and the operation unit 103 (not illustrated) based on a result of the execution, and controls an operation of each driving unit shown in FIG. 1.

Moreover, unit other than the driving units (shown in FIG. 5) are also realized by the CPU 401 executing programs.

An internal interface 407 is also connected to the internal bus 406 of the control circuit. The internal interface 407 connects the control circuit and the like of the operation unit 103 to the control unit of the multifunction peripheral 100.

The CPU 401 receives an instruction signal from the control circuit of the operation unit 103 and the like and transmits an instruction signal, data and the like to the control unit of the operation unit 103 and the like, via the internal interface 407.

The control circuit of the operation unit 103 is composed by connecting the CPU 409, the ROM 410, the RAM 411, the LCD 412, operation keys 413 (303), the touch screen 414 (301), and the internal interface 408 via the internal bus 415. When a user operates the operation keys 413 and the touch screen 414, the CPU 409 transmits an instruction signal based on the operation to the control circuit of the multifunction peripheral 100 via the internal interface 408. The CPU 409, the ROM 410 and the RAM 411 also function as described above, and unit described later (shown in FIG. 5) are also realized by the CPU 409 executing programs. Programs and data that realize the unit described below are stored in the ROM 410.

Figure 5:
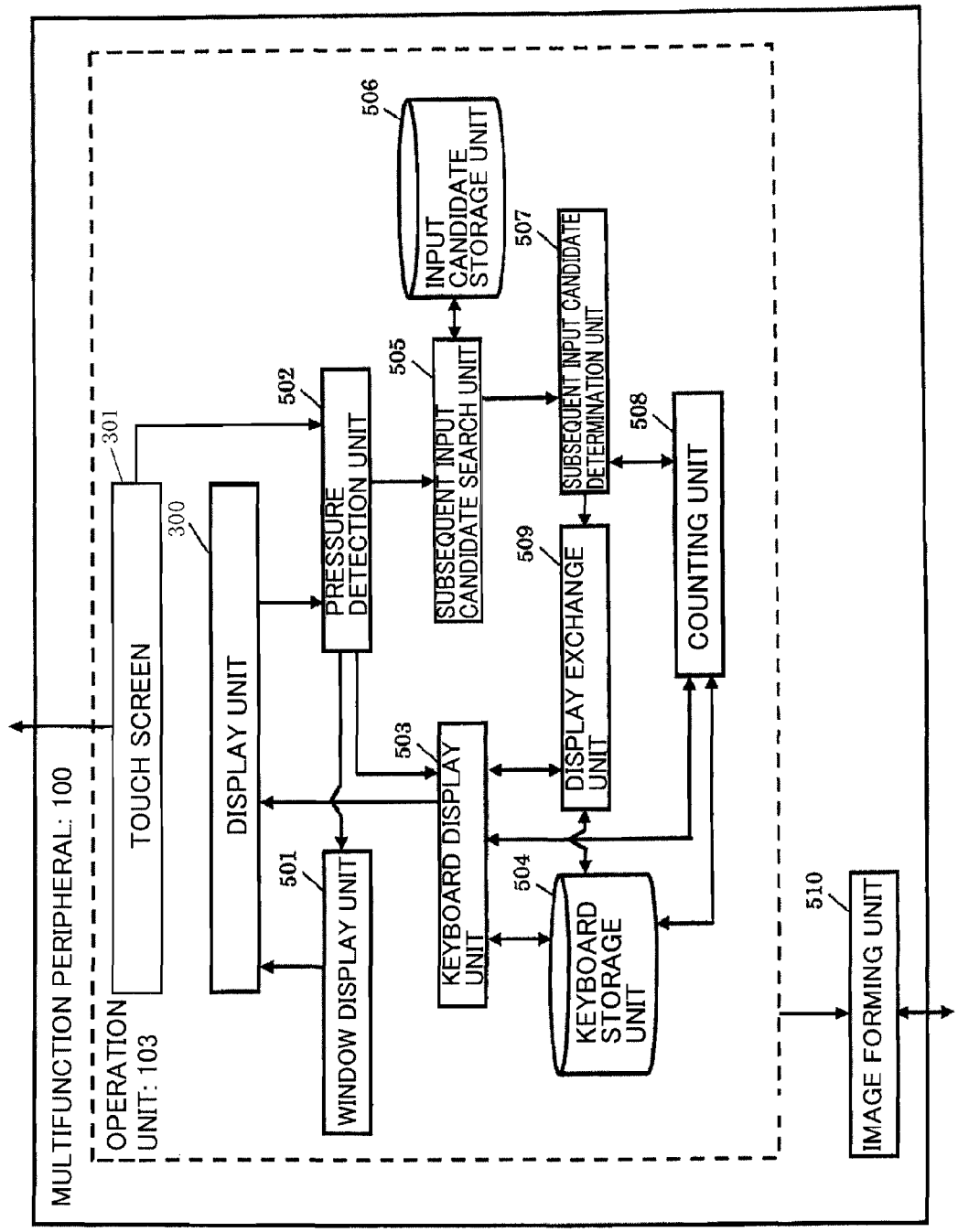
FIG. 5 is a functional block diagram of the multifunction peripheral and the operation unit according to an embodiment of the present invention.
Figure 6:
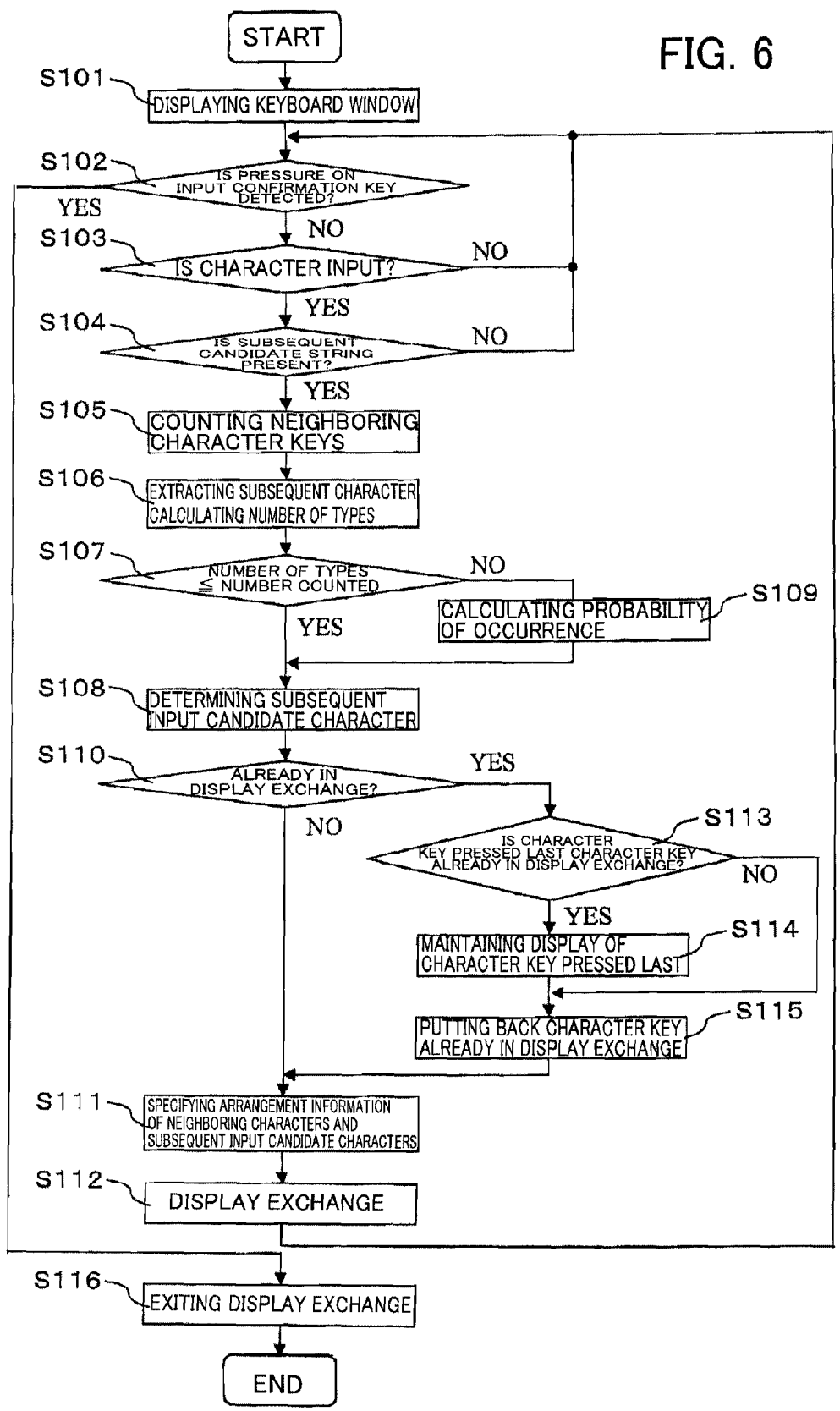
FIG. 6 is a flowchart showing an execution procedure of the embodiment of the present invention.

Next, steps in which the operation unit 103 of the embodiment of the present invention allows a user of a software keyboard to smoothly and appropriately input characters are described with reference to FIGS. 5 and 6. FIG. 5 is a functional block diagram of the operation unit and the multifunction peripheral according to an embodiment of the present invention. FIG. 6 is a flowchart showing an execution procedure of the embodiment of the present invention.

First, when a user turns on the multifunction peripheral 100, the operation unit 103 is activated upon activation of the multifunction peripheral 100. A window display unit 501 of the operation unit 103 displays a window for user authentication (in this example, a user authentication window shown in FIG. 7A) on the display unit 300. A window display unit 501 of the operation unit 103 displays a window for user authentication (in this example, a user authentication window shown in FIG. 7A) on the display unit 300. A window display unit 501 displays a window for user authentication that is visible from the outside through the touch screen 301. In other words, the window display unit 501 displays the window for user authentication on the touch screen 301 (FIG. 6, S101). Hereinafter, the window that is displayed on the display unit 300 and visible from the outside through the touch screen 301 may be referred to as a window displayed on the touch screen.

Figures 7A, 7B:
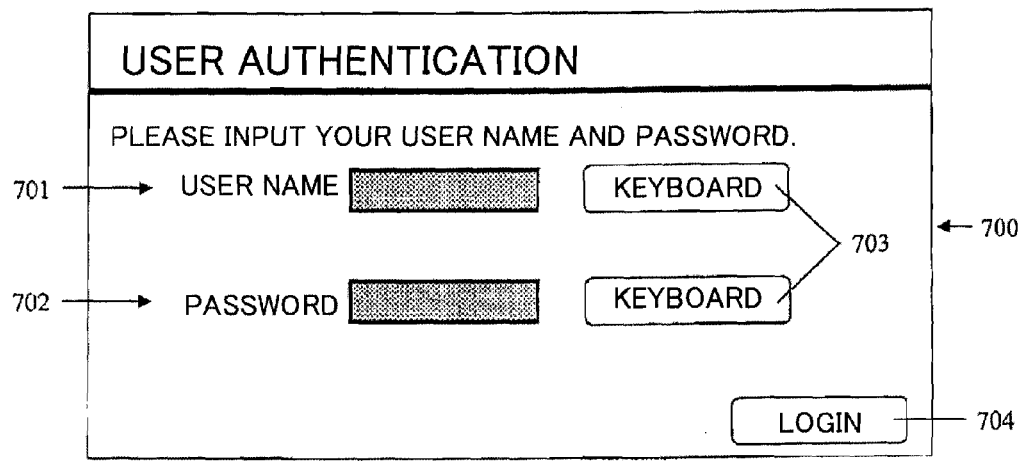
FIG. 7A is a diagram illustrating an example of a user authentication window displayed on a touch screen according to the embodiment of the present invention.
FIG. 7B is a diagram illustrating an example of a keyboard table according to the embodiment of the present invention.

FIG. 7A is a diagram illustrating an example of a user authentication window displayed on a touch screen according to the embodiment of the present invention.

As shown in FIG. 7A, the user authentication window 700 displays a user ID display field 701 that displays a user ID that is input, a password display field 702 that displays a password that is input, a (software) keyboard display key 703 for character input that is provided for each of the user ID display field 701 and the password display field 702, and a login key 704.

When a user looking at the user authentication window 700 presses the keyboard display key 703 for input of certain characters, a pressure detection unit 502 of the operation unit 103 detects pressure on the keyboard display key 703 and notifies a keyboard display unit 503 of the pressure.

In response to the notification, the keyboard display unit 503 references a keyboard table stored in advance in a keyboard storage unit 504 and displays a keyboard screen in which a plurality of character keys and an input confirmation key (for example, an OK key) for confirming input from the character keys are arranged in a predetermined arrangement.

FIG. 7B is a diagram illustrating an example of a keyboard table according to the embodiment of the present invention.

As shown in FIG. 7B, in the keyboard table 705, arrangement information 706 that represents arrangement of the character keys in the keyboard window, and characters 707 of the character keys corresponding to the arrangement information 706 are stored in association with each other. The arrangement information 706 stores an order of the character keys for the characters 707 with respect to a specific character key in the keyboard window.

Figure 8A:
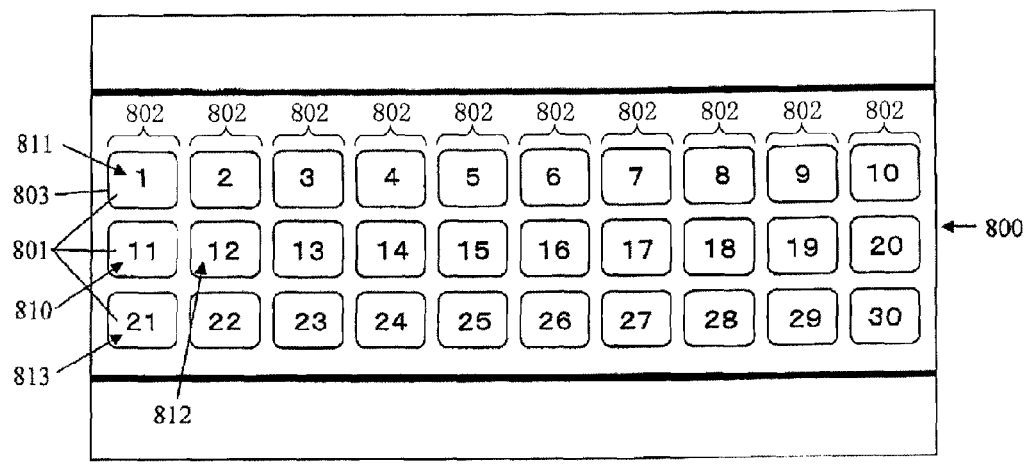
FIG. 8A is a diagram illustrating a relationship between a keyboard window and arrangement information of the keyboard table according to the embodiment of the present invention.

FIG. 8A is a diagram illustrating a relationship between a keyboard window and arrangement information of the keyboard table 705 according to the embodiment of the present invention.

For example, as shown in FIG. 8A, three character keys 801 are arranged vertically at predetermined intervals as a column 802. In the keyboard window 800, ten columns 802 are arranged horizontally at predetermined intervals. In the present embodiment, "1" is associated to the character key 803 positioned at an uppermost level in a leftmost column, as the arrangement information. Starting from the character key 803 positioned at the uppermost level in the leftmost column, the arrangement information of lower rank is sequentially associated in a rightward direction in the uppermost row (for example, "2" to the right of "1") and the arrangement information of further lower rank is associated in a downward direction in the leftmost column (for example, "11" below "1").

Figure 8B:
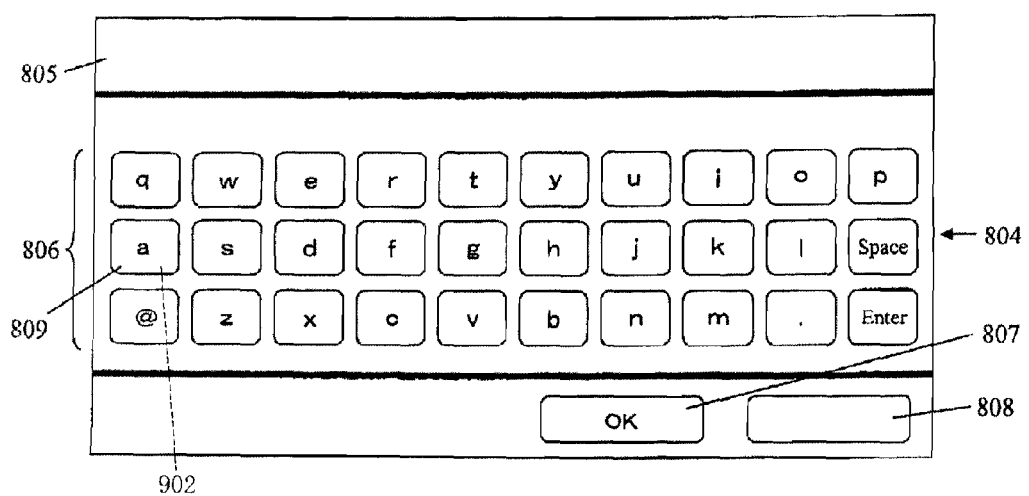
FIG. 8B is a diagram illustrating an example of the keyboard window according to an embodiment of the present invention, in which a plurality of character keys is arranged in a predetermined arrangement.

FIG. 8B is a diagram illustrating an example of the keyboard window according to an embodiment of the present invention, in which the character keys is disposed in a predetermined arrangement.

As shown in FIG. 8B, in the keyboard window 804, a character display field 805 that displays a string being input, a plurality of character keys 806 arranged in a predetermined arrangement (QWERTY arrangement), an OK key 807, and a Cancel key 808. The character display field 805 displays no character since the character keys 806 are not yet pressed.

When a user presses the character key (for example, an "a" key 809) corresponding to a certain character (for example, "a") (FIG. 6, S103 YES) without pressing the input confirmation key (the OK key 807) (FIG. 6, S102 NO), the pressure detection unit 502 detects the pressure on the character key and notifies the keyboard display unit 503 of the pressure.

In response to the notification, the keyboard display unit 503 changes background color of the character key thus detected from white to gray, and displays the character corresponding to the character key in the character display field 805.

In addition, the pressure detection unit 502 notifies a subsequent input candidate search unit 505 of the pressure. Upon detection of contact to an area corresponding to a specific character key in the touch screen 301, the subsequent input candidate search unit 505 searches among the input candidate string for an input candidate string with a first character being a specific character corresponding to the area thus detected, as a subsequent input candidate string.

In other words, in response to the notification, the subsequent input candidate search unit 505 references an input candidate table 900 stored in advance in an input candidate storage unit 506, and searches among the input candidate strings in the input candidate table 900 for an input candidate string with a first character being a character of the pressed character key 902 (in this case, "a") as a subsequent input candidate string (FIG. 6, S104).

Figure 9A:
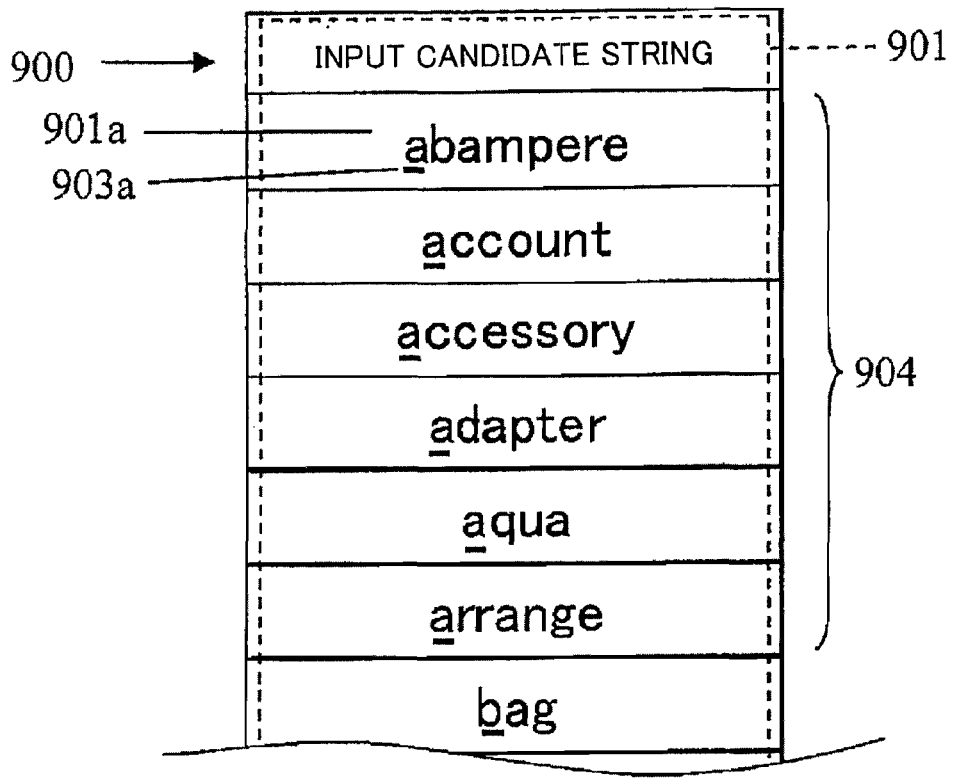
FIG. 9A is a diagram illustrating an example of an input candidate table according to the embodiment of the present invention.

FIG. 9A is a diagram illustrating an example of an input candidate table according to the embodiment of the present invention.

As shown in FIG. 9A, in the input candidate table 900, a plurality of specific strings is stored as candidate strings. The input candidate strings 901 (specific strings) includes, for example: a string determined based on Markov information source, in which a probability of occurrence of a certain event depends on a previous event; a string listed in a dictionary; a string empirically determined to be frequently input by a user during image formation; a string related to image formation; and a string related to a user ID.

Although the method by which the subsequent input candidate search unit 505 searches may be any method, one example is described below.

First, as shown in FIG. 9A, the subsequent input candidate search unit 505 references the certain input candidate string 901 in the input candidate table 900, and picks up characters of the same number as the pressed character 902 from the beginning of the input candidate string 901 thus referenced, as the first character.

As shown in FIG. 9A, if the input candidate string 901 thus referred is "abampere" 901a, given the number of the pressed character 902 being one ("a"), the first character 903a is "a", which is one character from the beginning of the "abampere" 901a.

In addition, the subsequent input candidate search unit 505 compares the first character 903a thus picked up with the pressed character 902, and determines matching therebetween.

As a result of the determination, if the first character 903 of the input candidate string 901 matches the pressed character 902, the subsequent input candidate search unit 505 temporarily stores the input candidate string 901 in a predetermined memory as a subsequent input candidate string 904. And then, the subsequent input candidate search unit 505 newly references the input candidate string 901 in the input candidate table 900, and performs the abovementioned determination with respect to the input candidate string 901.

On the other hand, as a result of the determination, if the first character 903 of the input candidate string 901 does not match the pressed character 902, the subsequent input candidate search unit 505 newly references the input candidate string 901 in the input candidate table 900, and performs the abovementioned determination.

If all the first characters 903 of all the input candidate strings 901 do not match the pressed character 902 (for example, in a case in which the pressed character 902 is "@" and the like), the subsequent input candidate search unit 505 terminates the processing (FIG. 6, S104 NO), since no subsequent input candidate string is found. In this case, until the input confirmation key is pressed (FIG. 6, S102 NO), the pressure detection unit 502 accepts pressure on the character keys by a user, through the keyboard window being displayed (FIG. 6, S103).

On the other hand, upon completion of the abovementioned determination with respect to all the input candidate strings 901 while the subsequent input candidate search unit 505 has temporarily stored a certain number of the subsequent input candidate strings 904 in a predetermined memory, the subsequent input candidate search unit 505 determines that the subsequent input candidate strings 904 have been found and notifies the subsequent input candidate determination unit (FIG. 6, S104 YES).

In response to the notification, the subsequent input candidate determination unit 507 activates a counting unit 508. The counting unit 508 thus activated counts the number of character keys arranged in the vicinity of the character key for the certain character as the first character. More specifically, the counting unit 508 counts the number of character keys (neighboring character keys) arranged in the vicinity of the character key that is pressed last, based on a character of the character key that is pressed last and the keyboard table 705 (FIG. 6, S105).

Further more specifically, the counting unit 508 counts the number of characters of the character keys disposed above, below, right, and left of the character key that is pressed last ("a"), based on the arrangement information of the character key that is pressed last.

For example, if the arrangement information of the character key that is pressed last ("a") is "11", the arrangement information of the character key disposed above the "11" 801 is "1" 811; the arrangement information of the character key disposed right is "12" 812; the arrangement information of the character key disposed below is "21" 813; and there is no arrangement information for a character key disposed left. As a result, the counting unit 508 determines the number of the neighboring character keys to be 3.

Upon completion of counting of the number of the neighboring character keys, the counting unit 508 notifies the subsequent input candidate determination unit 507.

The subsequent input candidate determination unit 507 extracts the subsequent character for all the subsequent input candidate strings that are found, and calculates the number of types of the subsequent characters thus extracted.

More specifically, in response to the notification, the subsequent input candidate determination unit 507 references the predetermined memory in which the subsequent input candidate strings are temporarily stored by the subsequent input candidate search unit 505; extracts the subsequent character to the first character 903 corresponding to the pressed character 902 for all the subsequent input candidate strings 904; and calculates the number of types of the subsequent characters thus extracted (FIG. 6, S106).

Figure 9B:
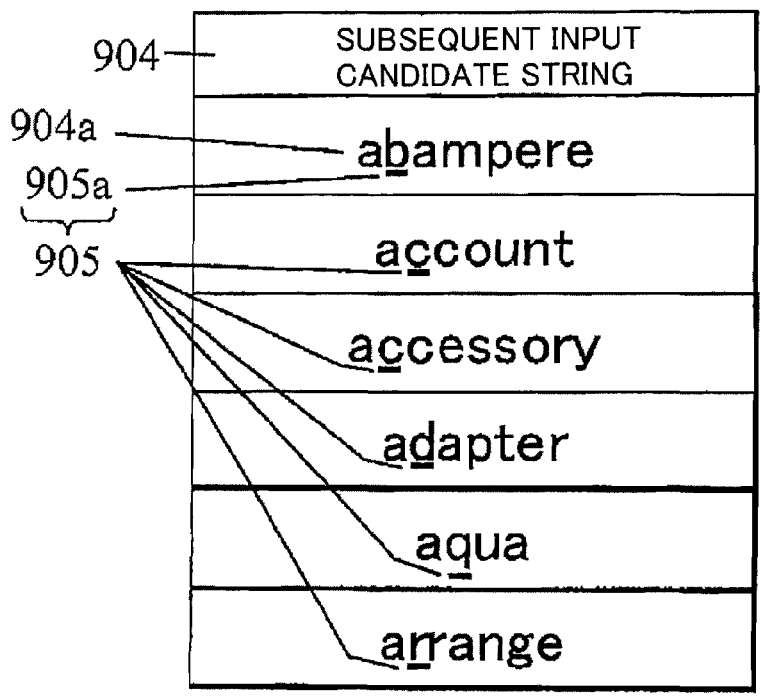
FIG. 9B is a diagram explaining determination of a subsequent input candidate character from a subsequent input candidate string according to the embodiment of the present invention.

For example, as shown in FIG. 9B, if the subsequent input candidate string 904 is "abampere" 904a, given the first character 903 corresponding to the pressed character 902 being "a", the subsequent input candidate determination unit 507 extracts "b" 905a as the subsequent input candidate character 905.

The subsequent input candidate determination unit 507 performs such extraction for all the subsequent input candidate strings 904. After extraction of the subsequent characters 905, the subsequent input candidate determination unit 507 calculates the number of types of the subsequent characters. For example, if the subsequent characters 905 thus extracted are: "b"; "c"; "c"; "d"; "q"; and "r", the subsequent input candidate determination unit 507 determines the number of types of the subsequent characters 905 to be 5: "b"; "c"; "d"; "q"; and "r".

Upon completion of calculation of the number of types of the subsequent characters, the subsequent input candidate determination unit 507 compares the number of types thus calculated with the number counted by the counting unit 508, thereby determining a magnitude relation therebetween (FIG. 6, S107).

The subsequent input candidate determination unit 507 determines the subsequent characters of all the types as the subsequent input candidate characters, if the number of types thus calculated is no greater than the number of the character keys counted.

In other words, as a result of determination, if the number of types (the number of types of characters being calculated) is no greater than the number counted (FIG. 6, S107 YES), the subsequent characters of all the types can be displayed as the neighboring character keys. Accordingly, the subsequent input candidate determination unit 507 determines the subsequent characters of all the types as the subsequent input candidate characters (FIG. 6, S108).

In addition, if the number of types thus calculated is greater than the number of the character keys thus counted, the subsequent input candidate determination unit 507 calculates a probability of occurrence of the subsequent character of each type, and determines the subsequent characters as the subsequent input candidate characters in a descending order of the probability of occurrence, until the number of the subsequent characters reaches the number of the character keys counted.

In other words, as a result of determination, if the number of types is greater than the number counted (FIG. 6, S107 NO), the subsequent characters of all the types cannot be displayed as the neighboring character keys. Accordingly, the subsequent input candidate determination unit 507 calculates a probability of occurrence of the subsequent character of each type (FIG. 6, S109).

In order to calculate a probability of occurrence of the subsequent character of a specific type, for example, the subsequent input candidate determination unit 507 obtains a proportion of the number of subsequent characters of the specific type to the total number of the subsequent characters extracted, as the probability of occurrence. More specifically, as shown in FIG. 9B, the probability of occurrence of the subsequent characters of each type is: $\frac{1}{6}$=17% for "b"; $\frac{2}{6}$=33% for "c"; $\frac{1}{6}$=17% for "d"; $\frac{1}{6}$=17% for "q"; and $\frac{1}{6}$=17% for "r".

After completion of calculation of a probability of occurrence of the subsequent character of each type, the subsequent input candidate determination unit 507 determines the subsequent characters, as many as the number counted, as the subsequent input candidate characters in a descending order of the probability of occurrence thus calculated (FIG. 6, S108). Here, in a case in which there is a plurality of the subsequent characters having the same probability of occurrence, the subsequent input candidate determination unit 507 determines the subsequent characters as the subsequent input candidate characters based on a predetermined priority order that is different from the probability of occurrence (for example, an alphabetical order).

For example, as shown in FIG. 9B, if "c" is determined first as the subsequent input candidate character 906 among the subsequent characters 905, "b" and "d" are subsequently determined as the subsequent input candidate characters 906 in an alphabetical order from characters having the same probability of occurrence: "b"; "d"; "q"; and "r". In such a way, even a plurality of the subsequent characters 905 is extracted, the subsequent characters that are most likely pressed by a user can be determined as the subsequent input candidate characters, thereby making a character input operation by a user more smooth.

Upon completion of determination of the subsequent input candidate characters 905, the subsequent input candidate determination unit 507 notifies a display exchange unit 509.

In response to the notification, if display exchange has not been made for a character key already pressed (FIG. 6, S110

NO), the display exchange unit 509 specifies: the arrangement information of neighboring character keys for a character key that is pressed last; and the arrangement information of the subsequent input candidate characters 906, that are displayed on the keyboard window (FIG. 6, S111), based on: information of a character of the character key pressed last, provided by the keyboard display unit 503; information of the subsequent input candidate characters 906, provided by the subsequent input candidate determination unit 507; and the keyboard table 705.

The display exchange unit 509 displays a character key of the subsequent input candidate character thus determined by exchanging with a character key arranged in the vicinity of a character key for a specific character as the first character. The display exchange unit 509 exchanges the character key of the subsequent input candidate character with a character key adjacent to the character key for the specific character as the first character, thereby displaying the character key for the subsequent input candidate character and the character key for the specific character as the first character adjacently.

More specifically, the display exchange unit 509 exchanges the arrangement information thus specified within the keyboard table 705, thereby displaying the character key for the subsequent input candidate characters and the character keys for the neighboring characters in a display exchange state (FIG. 6, S112).

Here, in a case in which there is a plurality of the first characters, the display exchange unit 509 displays the character key for the subsequent input candidate character thus determined by exchanging with a character key arranged in the vicinity of a character key corresponding to an area detected last (a character key pressed last).

Here, in a case of display exchange between character keys of a plurality of subsequent input candidate characters and the same number of neighboring character keys, the display exchange unit 509 displays character keys of the subsequent input candidate characters in a predetermined priority order (for example, the probability of occurrence and the alphabetical order, as described above) in place of the neighboring character keys in a predetermined arrangement order (for example, in a clockwise order from a character key directly above the character key pressed last).

Figure 10A:
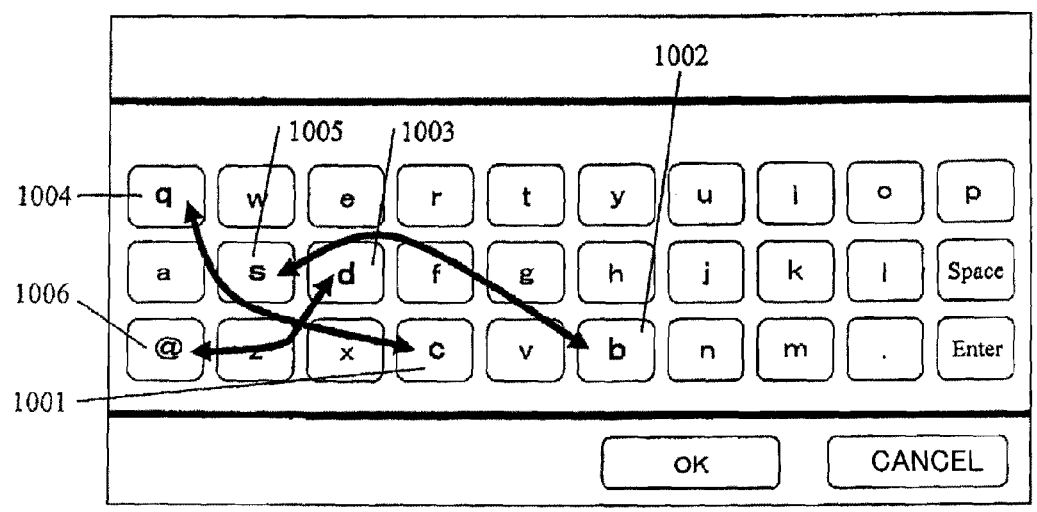
FIG. 10A is a diagram illustrating an example of the keyboard window according to the embodiment of the present invention, during exchange.

For example, in an example shown in FIGS. 9B and 10A, the subsequent input candidate characters 906 are, in a descending order of the probability of occurrence (priority order): "c" 1001; "b" 1002; and "d" 1003, and the neighboring characters are, in a descending order of the arrangement order: "q" 1004 (directly above the character key pressed last); "s" 1005 (directly right); and "@" 1005 (directly below), and the display exchange unit 509 exchanges display thereof as follows: "c" 1001 with "q" 1004; "b" 1002 with "s" 1005; and "d" 1003 with "@" 1006. If the subsequent input candidate characters 906 are the same as the neighboring characters, display does not change.

The display exchange unit 509 displays the character key for the subsequent input candidate character in the display exchange state in a display mode different from that of other character keys. More specifically, after completion of the display exchange, the display exchange unit 509 changes background color of the character key for the subsequent input candidate character in the display exchange state from white to gray, which is the same as background color of the character key pressed last.

In addition, the display exchange unit 509 displays the character key for the specific character as the first character and the character key for the subsequent input candidate character in the display exchange state in a concatenated state. In other words, the display exchange unit 509 concatenates the character key for the subsequent input candidate character in the display exchange state and the character key pressed last.

Figure 10B:
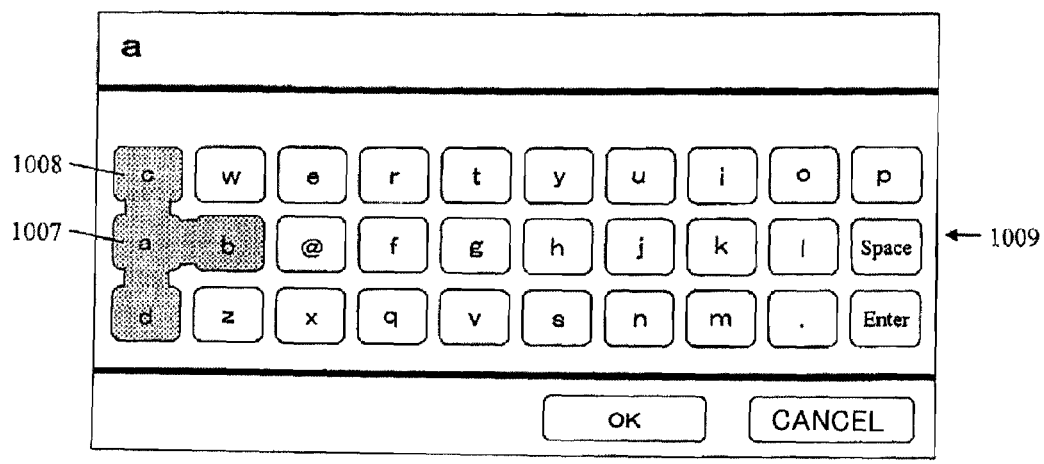
FIG. 10B is a diagram illustrating an example of the keyboard window according to the embodiment of the present invention, after display exchange.

FIG. 10B is a diagram illustrating an example of the keyboard window according to the embodiment of the present invention, after display exchange.

As shown in FIG. 10B, in the keyboard window 1009 after the display exchange, a character key 1008 for the subsequent input candidate character appears (is displayed) in the vicinity of a character key 1007 pressed last, while the character key 1008 is concatenated with the character key 1007 in the same background color.

As a result, when a user presses the subsequent input candidate character key 1008, the user can promptly press a subsequent character key without looking for a character key to be pressed within the keyboard window 1009, and can smoothly input characters.

In addition, since the character key for the subsequent input candidate character after display exchange is displayed in a different mode from that of other character keys, the user can easily recognize the character keys for the subsequent input candidate characters and can further smoothly input characters.

Here, if the user does not press the input confirmation key (FIG. 6, S102 NO) and continues pressing a new character key (for example, a character key for "b") (FIG. 6, S103 YES), the multifunction peripheral operates as follows.

First, the pressure detection unit 502 notifies the keyboard display unit 503 of the pressure on the new character key. In response to the notification, the keyboard display unit 503 changes background color of the character key newly pressed, and displays the character "b" corresponding to the new character key next to "a" in the character display field.

Next, the pressure detection unit 502 notifies the subsequent input candidate search unit 505 of the pressure on the new character key.

The subsequent input candidate search unit 505 considers the first character ("a") and the character pressed last ("b") as the pressed characters ("ab"), and searches for the input candidate string starting with the pressed characters (FIG. 6, S104).

For example, in the input candidate table 900 shown in FIG. 9A, "abampere" 901a is the only input candidate string 901 starting with "ab". Given this, the subsequent input candidate search unit 505 finds "abampere" 901a as the subsequent input candidate string 904 (FIG. 6, S104 YES).

Subsequently, the subsequent input candidate determination unit 507 determines a character "a" that follows the first characters "ab" as the subsequent input candidate character 906, based on the number counted by the counting unit 508 (in the case of "b", 4) and "abampere" 901a described above, and notifies the display exchange unit 509 (FIG. 6, S105, S106, S107 YES, and S108).

In response to the notification, the display exchange unit 509 determines whether the character key pressed last is the character key already in the display exchange state (FIG. 6, S113), since the specific character key has been in the display exchange state (FIG. 6, S110 YES) in response to previous detection of pressure on the character key (the character key "a").

Here, upon detection of contact to an area in the touch screen 301 corresponding to a specific subsequent input candidate character among the character keys for the plurality of subsequent input candidate characters that are brought in the display exchange state by the display exchange unit 509 to be displayed in the vicinity of the character key for the specific character as the first character, the display exchange unit 509 maintains display exchange between the character key for the specific subsequent input candidate character corresponding to the area in which contact is detected and a character key exchanged therewith; and, regarding the plurality of subsequent input candidate characters, exits display exchange between character keys for the subsequent input candidate characters other than the specific subsequent input candidate character and character keys exchanged therewith, thereby displaying the character keys in an original arrangement before the display exchange.

More specifically, as a result of the determination, if the character key pressed last (the character key for a character "b") is a character key that has already been in the display exchange state (FIG. 6, S113 YES), the display exchange unit 509 maintains the display exchange between the character key that is pressed last and that has already been in the display exchange state (for example, the character key for the subsequent input candidate character "b") and a character key that has been exchanged with the character key (for example, the neighboring character key "s" that has been exchanged with the subsequent input candidate character "b") (FIG. 6, S114).

Subsequently, the display exchange unit 509 puts back the character keys which have already been in the display exchange state to an original arrangement, except for the character key that is maintained in the display exchange (FIG. 6, S115).

Figure 11A:
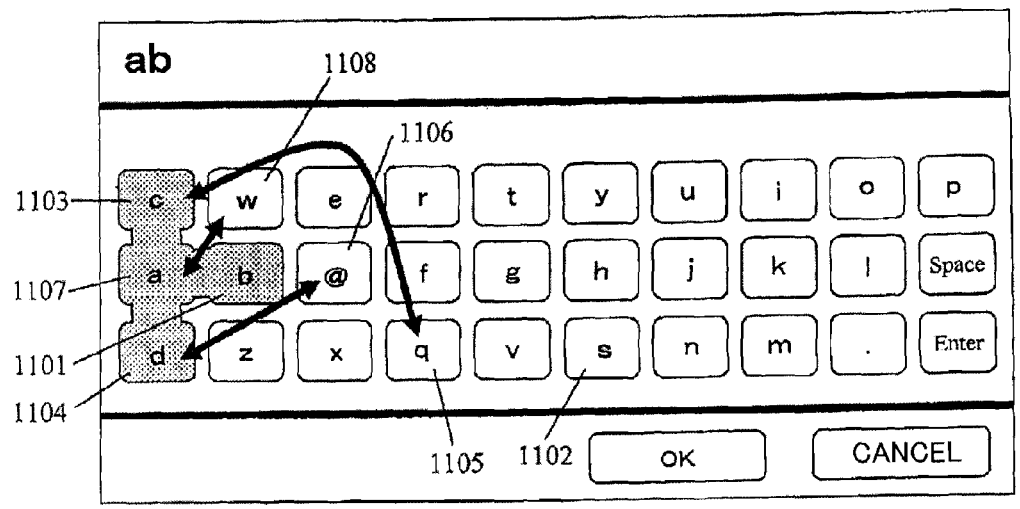
FIG. 11A is a diagram illustrating an example of the keyboard window according to the embodiment of the present invention, during exchange.

For example, in an example shown in FIG. 11A, the character key pressed last is the subsequent input candidate character "b" 1101 that has already been in the display exchange state; accordingly, the display exchange unit 509 maintains the display exchange between the character key for the character "b" 1101 and a character key for the character "s" 1102 that has been exchanged therewith.

In addition, except for the character keys that are maintained in the display exchange: "b" 1101 and "s" 1102, the display exchange unit 509 puts back the character keys for the subsequent input candidate characters "c" 1103, and "d" 1104, which have been in the display exchange state, and the character keys for the neighboring characters "q" 1105 and "@" 1106, which have been exchanged wherewith, to the original arrangement.

On the other hand, as a result of the determination, if the character key that is pressed last is not the character key that has already been in the display exchange state (FIG. 6, S113 NO), the display exchange unit 509 puts back all the character keys that has already been in the display exchange state to an original arrangement (FIG. 6, S115).

In such a way, even in a case in which a user presses a character key already in the display exchange state, in other words in a case in which the character key already in the display exchange state becomes the character key that is pressed last, the display exchange unit 509 can perform the display exchange, between the character keys for the subsequent input candidate characters, newly determined, with the character keys for the neighboring characters of the character key pressed last, without putting back the character key pressed last to the original arrangement.

After putting back the character key that has already been in the display exchange to the original arrangement (FIG. 6, S115), the display exchange unit 509 specifies the neighboring character key (the character key for "w" 1108 immediately above the character key pressed last) for the character key pressed last (the character key for "b" 1101) and the character key for the subsequent input candidate character (the character key for "a" 1107) as shown in FIG. 11A (FIG. 6, S111), and then displays by exchanging the character key for the subsequent input candidate character "a" 1107 thus specified with the character key for the neighboring character "w" 1108 on the keyboard screen (FIG. 6, S112).

Figure 11B:
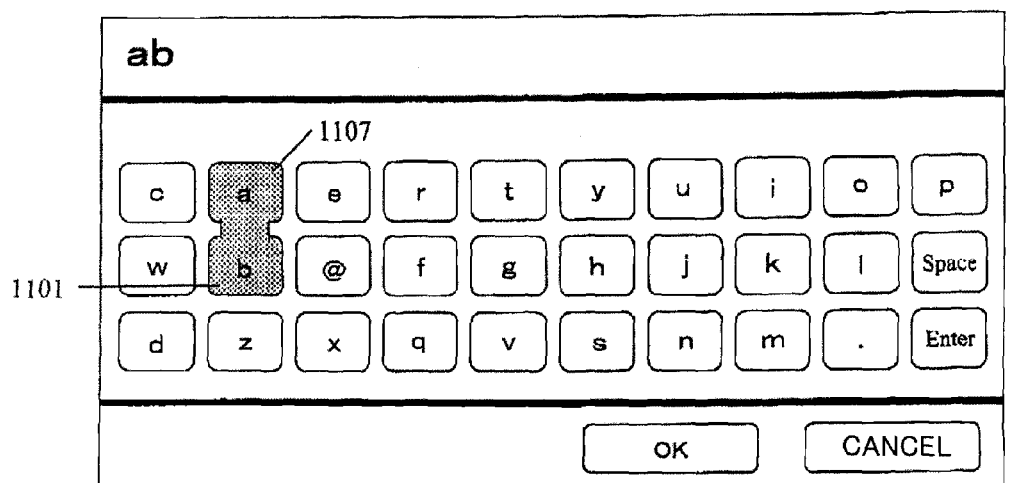
FIG. 11B is a diagram illustrating an example of the keyboard window according to the embodiment of the present invention, after display exchange.

In addition, the display exchange unit 509 changes the background color of the character key for the subsequent input candidate character "a" 1107 in the display exchange state to the same color as that of the character key pressed last "b" 1101, and displays these keys in a concatenated state as shown in FIG. 11B. In such a way, a user can input characters rapidly and smoothly, as the character keys for the subsequent input candidate characters appear in the vicinity of the character key pressed last even if the user presses character keys successively.

When a user presses the input confirmation key (for example, the OK key 807) without pressing subsequent character key (FIG. 6, S103 NO), the pressure detection unit 502 accepts input confirmation of the characters that have been input (pressed characters) and notifies the keyboard display unit 503 of the confirmation. In response to the notification, the keyboard display unit 503 determines the pressed characters as input characters. Character input by a user is thus completed.

In addition, the pressure detection unit 502 notifies the display exchange unit 509 of detection of pressure on the input confirmation key.

The display exchange unit 509 exits display exchange upon detection of contact to an area in the touch screen 301 corresponding to the input confirmation key.

More specifically, in response to the notification, the display exchange unit 509 puts back the arrangement information of the character key for the subsequent input candidate characters in the display exchange state and the arrangement information of the character keys for the neighboring characters in the display exchange state to the original arrangement within the keyboard table 705 (FIG. 6, S116).

After determination of the input characters, for example, the keyboard display unit 503 notifies the window display unit 501 of the input characters thus determined and clears the keyboard window 804. In this case, the window display unit 501 displays the input characters thus determined in a display column corresponding to the keyboard display key pushed by a user, in the user authentication window 700. Thereafter, when the user completes user login through the user authentication window 700 by the input characters thus determined, the window display unit 501 displays an initial window relating to image formation on the touch screen 301, and notifies an image formation unit 510.

Although a case in which the OK key 807 is pressed as the input confirmation key has been described, the display exchange unit 509 can be configured to put back the character keys for the subsequent input candidate characters and the character keys for the neighboring characters in the display exchange state to the original arrangement and to exit the display exchange when a space key for inputting a space between characters or an enter key for temporarily confirming input of pressed characters is pressed.

An example showing the abovementioned effect of the invention is described hereinafter. Although results may somewhat vary depending on the size of display area of the keyboard window, the size of character keys in the keyboard, the total number of character keys and the like, by comparing: an operation unit (operation unit of Example) provided with a configuration of the embodiment of the present invention (the subsequent input candidate search unit 505, the subsequent input candidate determination unit 507, and the display exchange unit 590); with an operation unit (operation unit of Comparative Example) that is similar to the operation unit of Example except for not being provided with the configuration of the embodiment of the present invention, in a case of inputting, for example, "abampere" 904a corresponding to the input candidate string, an amount of time required for the input tends to be only a few seconds with the operation unit of Example that displays sequentially the character keys for the subsequent input candidate characters in the vicinity of the character key pressed last, while a user has difficulty in finding subsequent character keys and thus the amount of time required for the input tends to be long, in other words a few dozens of seconds to a few minutes, with the operation unit of Comparative Example. Such tendencies show that the operation unit of Example can allow a user of a software keyboard to smoothly and appropriately input characters.

As described above, the operation unit 103 of the present invention is provided with: the input candidate storage unit 506 that stores at least one specific string as the input candidate string; the subsequent input candidate search unit 505 that, in a case in which a specific character key is pressed without pressing the input confirmation key, searches among the at least one input candidate string for an input candidate string with a first character being the pressed character, as the subsequent input candidate string; the subsequent input candidate determination unit 507 that determines a character following the first character in the subsequent input candidate string thus found as the subsequent input candidate character; and the display exchange unit 509 that displays a character key for the subsequent input candidate character thus determined by exchanging with a character key disposed in the vicinity of the character key pressed last.

In such a configuration, when a user presses a specific character key, subsequent input candidate character keys, which are expected to be pressed by the user after the character key, are displayed (appear) in the vicinity of the character key. As a result, when a user presses the subsequent input candidate character key, the user can promptly press a subsequent character key without looking for a character key to be pressed, and can smoothly and appropriately input characters. This is especially helpful for a user who can smoothly input characters with a hardware keyboard but has difficulty in inputting characters with a software keyboard due to a difference in character key arrangement therebetween. The user can press the character keys without being bothered by the difference in character key arrangement.

Although, in the embodiment of the present invention, the input candidate string is composed of alphabetical characters and characters of the character keys displayed to be selectable on the keyboard window are alphabetical characters, the present invention can be configured otherwise. For example, characters such as hiragana, katakana (Japanese characters), and Chinese characters can be employed instead of, or along with, alphabetical characters for the input candidate strings and for the character keys displayed to be selectable on the keyboard window.

In addition, in the embodiment of the present invention, the display exchange unit 509 is configured to change the background color of the character key for the subsequent input candidate character to the same color as that of the character key pressed last (different from the background color of other character key), and to display these keys in a concatenated state; however, the present invention can be configured otherwise. For example, when the display exchange unit 509 displays the character key for the subsequent input candidate character in the display exchange state in a display mode different from that of other character keys, only the background color thereof can be changed, without concatenating with the character key pressed last.

In addition, in the embodiment of the present invention, the display exchange unit 509 is configured to simply exchange the character keys of the subsequent input candidate characters with the neighboring character keys of the character key pressed last; however, the present invention can be configured otherwise. For example, the display exchange unit 509 can be configured to: display the character keys of the subsequent input candidate characters and the neighboring character keys in front of other character keys in the keyboard window; visually move the character keys of the subsequent input candidate characters toward the neighboring character keys; and display the character keys of the subsequent input candidate characters in the arrangement of the neighboring character keys. Alternatively, the display exchange unit 509 can be configured to: visually move neighboring character keys toward the character keys of the subsequent input candidate characters; and display the neighboring character keys in the arrangement of the character keys of the subsequent input candidate characters. The display exchange unit 509 can thus be configured to realize the display exchange by dynamically moving the character key for the subsequent input candidate character and the neighboring character keys.

Furthermore, the operation unit 103 according to the embodiment of the present invention has been applied to processing of copy service in the multifunction peripheral 100; however, the operation unit 103 can also be applied to fax transmission service, printing service, and the like. Moreover, in the embodiment of the present invention, the operation unit 103 is applied to a multifunction peripheral; however, the same operation and effect can be obtained by applying the operation unit 103 to various image forming apparatuses, various electronic apparatuses, various measurement apparatuses and the like provided with an operation unit (the character input device) having a touch screen.

In addition, according to the embodiment of the present invention, the operation unit 103 is configured to include the each corresponding unit; however, it is possible to employ a configuration in which programs that realize each corresponding unit are recorded in a recording medium, and this recording medium is provided. According to this configuration, the program is read by the operation unit 103 or the multifunction peripheral 100, and the operation unit 103 or the multifunction peripheral 100 realizes each corresponding unit. In this case, the program read from the recording medium itself provides the advantageous effect of the present invention. In addition, steps performed by each corresponding unit can be provided as methods stored in a hard disk.

As described above, the character input device and the character input method according to the present invention are applicable to a copy machine, a printer, as well as a multifunction peripheral, and effective for allowing a user of a software keyboard to smoothly and appropriately input characters.

What is claimed is:

1. A character input device comprising:
   an operation unit having a display part that can display a plurality of character keys and an input confirmation key in a predetermined arrangement and a touch screen that is disposed on a front face of the display part;
   an input candidate storage unit that stores at least one string as an input candidate string;
   a candidate string search unit that searches among input candidate strings when a user touches an area corresponding to a character key corresponding to a specific character in the touch screen for a subsequent input candidate string which includes the specific character as a head character;

a candidate character determination unit that determines a subsequent input candidate character following the head character with respect to the subsequent input candidate string thus searched;

a display exchange unit that replaces a character key arranged in a vicinity of the character key corresponding to the specific character as the head character with a character key corresponding to the subsequent input candidate character thus determined and to cause the display part to display the character key corresponding to the subsequent input candidate character; and a counting unit that counts a total number of character keys arrangeable in the vicinity of the character key corresponding to the specific character as the head character each time the user touches the area corresponding to the character key corresponding to the specific character in the touch screen, wherein the total number of character keys thus counted varies according to a position of the character key corresponding to the specific character as the head character with respect to the display part, wherein the candidate character determination unit: extracts subsequent characters for all subsequent input candidate strings that are searched by the candidate string search unit;

calculates a total number of types of the subsequent characters thus extracted;

determines the subsequent characters of all the types as the subsequent input candidate characters, if the total number of types thus calculated is no greater than the total number of the character keys counted;

calculates a probability of occurrence of a subsequent character of each type, if the total number of types thus calculated is greater than the total number of the character keys thus counted; and determines the subsequent characters as the subsequent input candidate characters in a descending order of the probability of occurrence, until the number of the subsequent characters reaches the total number of the character keys counted.

2. The character input device according to claim 1, wherein the display exchange unit replaces a character key adjacent to the character key corresponding to the specific character as the head character with the character key corresponding to the subsequent input candidate character, thereby displaying the character key corresponding to the subsequent input candidate character and the character key corresponding to the specific character as the head character to be adjacent to each other.

3. The character input device according to claim 1, wherein, in a case in which there is a plurality of head characters, the display exchange unit replaces a character key arranged in a vicinity of a character key corresponding to an area detected last with the character key corresponding to the subsequent input candidate character thus determined, thereby causing the display part to display the character key corresponding to the subsequent input candidate character.

4. The character input device according to claim 1, wherein the input candidate string is selected from a group consisting of:

a string determined based on Markov information source, in which a probability of occurrence of a certain event depends on a previous event;

a string listed in a dictionary;

a string empirically determined to be frequently input by a user during image formation;

a string related to image formation; and a string related to a user ID.

5. The character input device according to claim 1, wherein the display exchange unit displays the character key corresponding to the subsequent input candidate character after display exchange in a display mode different from that of other character keys.

6. The character input device according to claim 1, wherein the display exchange unit displays the character key corresponding to the specific character as the head character in a concatenated state with the character key for the subsequent input candidate character after display exchange.

7. The character input device according to claim 1, wherein, upon detection of contact to an area in the touch screen corresponding to a specific subsequent input candidate character among the character keys corresponding to the plurality of subsequent input candidate characters that are displayed by the display exchange unit to be in the vicinity of the character key corresponding to the specific character as the head character, the display exchange unit maintains display exchange between the character key for the specific subsequent input candidate character corresponding to the area in which contact is detected and a character key exchanged therewith; and displays the character keys in an original arrangement before display exchange while stopping the display exchange between character keys corresponding to the subsequent input candidate characters other than the specific subsequent input candidate character and character keys exchanged therewith, among the plurality of subsequent input candidate characters.

8. The character input device according to claim 1, wherein the display exchange unit stops display exchange upon detection of contact to an area in the touch screen corresponding to the input confirmation key.

9. An image forming apparatus comprising a character input device, the character input device including: an operation unit having a display part that can display a plurality of character keys and an input confirmation key in a predetermined arrangement and a touch screen that is disposed on a front face of the display part;

an input candidate storage unit that stores at least one string as an input candidate string;

a candidate string search unit that searches among input candidate strings when a user touches an area corresponding to a character key corresponding to a specific character in the touch screen for a subsequent input candidate string which includes the specific character as a head character;

a candidate character determination unit that determines a subsequent input candidate character following the head character with respect to the subsequent input candidate sting thus searched;

a display exchange unit that replaces a character key arranged in a vicinity of the character key corresponding to the specific character as the head character with a character key corresponding to the subsequent input candidate character thus determined and to cause the display part to display the character key corresponding to the subsequent input candidate character; and a counting unit that counts a total number of character keys arrangeable in the vicinity of the character key corresponding to the specific character as the head character each time the user touches the area corresponding to the character key corresponding to the specific character in the touch screen,
wherein the total number of character keys thus counted varies according to a position of the character key corresponding to the specific character as the head character with respect to the display part,
wherein the candidate character determination unit:
extracts subsequent characters for all subsequent input candidate strings that are searched by the candidate string search unit;
calculates a total number of types of the subsequent characters thus extracted;
determines the subsequent characters of all the types as the subsequent input candidate characters, if the total number of types thus calculated is no greater than the total number of the character keys counted;
calculates a probability of occurrence of a subsequent character of each type, if the total number of types thus calculated is greater than the total number of the character keys thus counted; and
determines the subsequent characters as the subsequent input candidate characters in a descending order of the probability of occurrence, until the number of the subsequent characters reaches the total number of the character keys counted.

10. The image forming apparatus according to claim 9, wherein the display exchange unit replaces a character key adjacent to the character key corresponding to the specific character as the head character with the character key corresponding to the subsequent input candidate character, thereby displaying the character key corresponding to the subsequent input candidate character and the character key corresponding to the specific character as the head character to be adjacent to each other.

11. The image forming apparatus according to claim 9, wherein, in a case in which there is a plurality of the head characters,
the display exchange unit replaces a character key arranged in a vicinity of a character key corresponding to an area detected last with the character key corresponding to the subsequent input candidate character thus determined, thereby causing the display part to display the character key corresponding to the subsequent input candidate character.

12. The image forming apparatus according to claim 9, wherein the input candidate string is selected from a group consisting of:
a string determined based on Markov information source, in which a probability of occurrence of a certain event depends on a previous event;
a string listed in a dictionary;
a string empirically determined to be frequently input by a user during image formation;
a string related to image formation; and
a string related to a user ID.

13. The image forming apparatus according to claim 9, wherein the display exchange unit displays the character key corresponding to the subsequent input candidate character after display exchange in a display mode different from that of other character keys.

14. The image forming apparatus according to claim 9, wherein the display exchange unit displays the character key corresponding to the specific character as the head character in a concatenated state with the character key for the subsequent input candidate character after display exchange.

15. The image forming apparatus according to claim 9, wherein, upon detection of contact to an area in the touch screen corresponding to a specific subsequent input candidate character among the character keys corresponding to the plurality of subsequent input candidate characters that are displayed by the display exchange unit to be in the vicinity of the character key corresponding to the specific character as the head character,
the display exchange unit maintains display exchange between the character key for the specific subsequent input candidate character corresponding to the area in which contact is detected and a character key exchanged therewith; and
displays the character keys in an original arrangement before the display exchange while stopping the display exchange between character keys corresponding to the subsequent input candidate characters other than the specific subsequent input candidate character and character keys exchanged therewith, among the plurality of subsequent input candidate characters.

16. The image forming apparatus according to claim 9, wherein the display exchange unit stops the display exchange upon detection of contact to an area in the touch screen corresponding to the input confirmation key.

17. A character key display method for a character input device, the character input device including: an operation unit having a display part that can display a plurality of character keys and an input confirmation key in a predetermined arrangement and a touch screen that is disposed on a front face of the display part; and an input candidate storage unit that stores at least one specific string as an input candidate string, the method comprising:
searching among input candidate strings when a user touches an area corresponding to a character key corresponding to a specific character in the touch screen for a subsequent input candidate string which includes the specific character as a head character;
determining a subsequent input candidate character following the head character with respect to the subsequent input candidate string thus searched;
replacing a character key arranged in a vicinity of the character key corresponding to the specific character as the head character with a character key corresponding to the subsequent input candidate character thus determined and causing the display part to display the character key corresponding to the subsequent candidate character; and
counting a total number of character keys arrangeable in the vicinity of the character key corresponding to the specific character as the head character each time the user touches the area corresponding to the character key corresponding to the specific character in the touch screen,
wherein the total number of character keys thus counted varies according to a position of the character key corresponding to the specific character as the head character with respect to the display part,
wherein the step of determining a subsequent input candidate character comprises:
extracting subsequent characters for all subsequent input candidate strings that are searched in the step of searching;
calculating a total number of types of the subsequent characters thus extracted;
determining the subsequent characters of all the types as the subsequent input candidate characters, if the total number of types thus calculated is no greater than the total number of the character keys counted;

calculating a probability of occurrence of a subsequent character of each type, if the total number of types thus calculated is greater than the total number of the character keys thus counted; and determining the subsequent characters as the subsequent input candidate characters in a descending order of the probability of occurrence, until the number of the subsequent characters reaches the total number of the character keys counted.

\* \* \* \* \*